INVENTORS
FRANCIS P. KEIPER, JR.
CHARLES P. COMEAU
BY
D R Presaman
ATTORNEY

INVENTORS
FRANCIS P. KEIPER, JR.
CHARLES P. COMEAU
BY
D P Pressman
ATTORNEY

United States Patent Office 3,484,622

Patented Dec. 16, 1969

3,484,622

VOLTAGE SQUARING CIRCUIT EMPLOYING FORWARD BIASED TRANSISTORS WITH COMMON COLLECTOR LOAD IMPEDANCE

Francis P. Keiper, Jr., and Charles P. Comeau, Oreland, Pa., assignors to Philco-Ford Corporation, Philadelphia, Pa., a corporation of Delaware Filed May 24, 1966, Ser. No. 552,587
Int. Cl. H03k 4/04
U.S. Cl. 307—229 13 Claims

ABSTRACT OF THE DISCLOSURE

Voltage squaring circuits wherein, in a first embodiment, two transistors having a common collector load resistor and forward-biased base-emitter junctions are driven in class B push-pull by a bipolar input signal, whereby the collector current of each will be proportional to the square of said input signal. In a second embodiment, the current drawn by a saturated third transistor having a large collector load resistor forward biases the two squaring transistors; the bases of all three transistors are connected to a constant current source. In a third embodiment the current drawn by the two transistors, which are saturated due to a large collector common load impedance, forward biases the third transistor, which is used as the squaring transistor.

The present invention is a circuit for generating an output voltage whose value at any instant is equal to the arithmetic square of the value of the corresponding instant of an input voltage. Such a circuit is useful, and is described for exemplary purposes, as a parabolic voltage waveform generator which may be used for dynamic focus purposes in a cathode ray tube circuit to generate a parabolic waveform output voltage in response to a sawtooth input voltage derived from current flowing through a deflection yoke associated with the tube. The present squaring circuit may be used also as an untuned frequency doubler since the square of a sinusoidal waveform of one frequency will be a sinusoidal waveform of double said one frequency, albeit at a different reference level.

In the past, squaring circuits have comprised passive square law devices (such as diodes) connected to a DC amplifier. The operation of such squaring circuits tends to be unstable because changes in temperature, bias voltage, etc., cause inaccuracy and drifting, necessitating the use of complicated compensating circuitry. Also such circuits have very restricted input and output voltage ranges, and usually are not capable of squaring bipolar input signals.

Accordingly several objects of the present invention are: (1) the provision of a novel and improved voltage squaring circuit, (2) the provision of a transistorized voltage squaring circuit which is relatively insensitive to changes in temperature and bias, which is relatively simple in design, which does not require the use of diodes or other passive square law devices, and which has large input and output voltage ranges, (3) the provision of a new and improved parabolic voltage waveform generator which utilizes the squaring circuit of the present invention, and (4) the provision of a circuit which can square a bipolar input signal. Other objects and advantages of the present invention will become apparent from a consideration of the ensuing description thereof.

DRAWINGS

FIGS. 1–2

Figure 1:
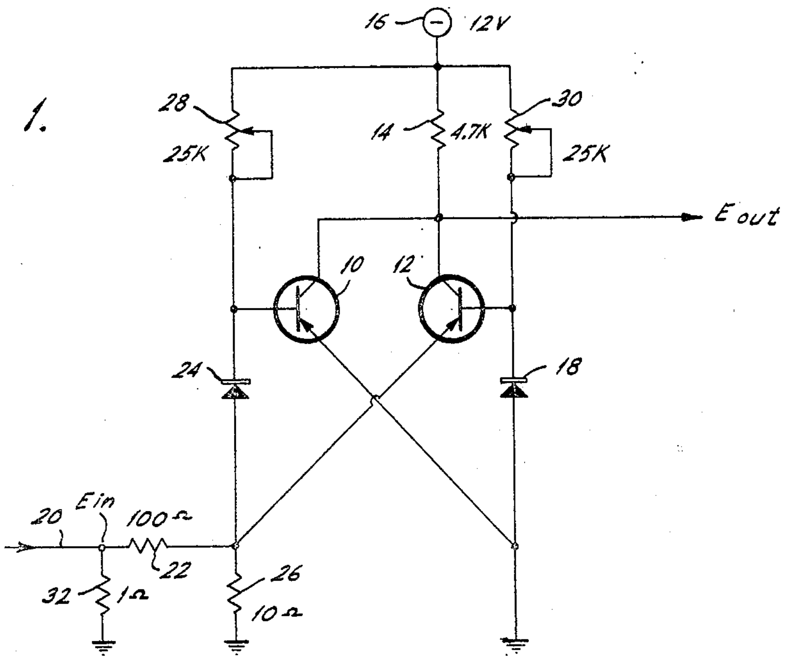
FIG. 1 is a schematic diagram of a basic embodiment of the present invention.
Figure 2:
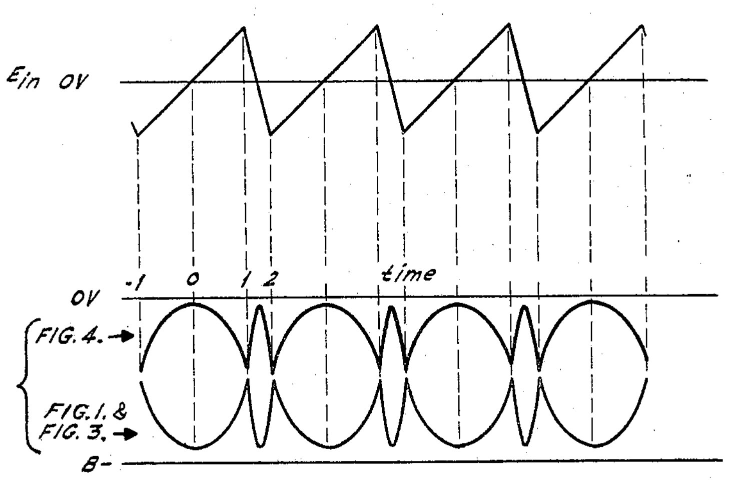
FIG. 2 is a voltage waveform diagram used to explain the operation of the circuit of the present invention.

The basic squaring circuit of the invention is shown in FIG. 1. A typical input voltage waveform for said circuit and the resultant output waveform are shown in FIG. 2 where indicated. According to the present example, the input voltage is derived from and is proportional to the yoke current in a cathode ray tube deflection circuit. The input voltage will thus have a sawtooth waveform balanced with respect to ground; the output voltage waveform will have a parabolic waveshape and is useful as a dynamic focus voltage for the cathode ray tube.

The circuit of FIG. 1 comprises two transistors 10 and 12 whose collectors are commonly connected via a single load resistor 14 to one terminal of a negative voltage source 16, the other terminal of which is connected to ground or reference potential. The emitter of transistor 10 is connected to ground, and the base of transistor 12 is also connected to ground by way of a diode 18. The emitter of transistor 12 is connected to an input terminal 20 by way of a resistor 22, and the base of transistor 10 is also connected to input terminal 20 by way of resistor 22 and a diode 24. The junction of resistor 22 and diode 24 is connected to ground by way of a resistor 26. The base of transistor 10 is connected to source 16 by way of a variable resistor 28, and the base of transistor 12 is connected to source 16 by way of a variable resistor 30. Typical values for the various components are indicated in FIG. 1.

A convenient way to derive the sawtooth voltage $E_{in}$ shown in FIG. 2 is to connect a 1 ohm resistor between ground and the ground terminal of the deflection yoke so that the deflection current will appear as a sawtooth voltage waveform across said 1 ohm resistor. Such a series 1 ohm resistor is shown at 32; for purposes of simplification, the actual deflection yoke is not shown.

The output voltage waveform of the circuit of FIG. 1 has a parabolic waveshape as shown in FIG. 2 and is the square of the input voltage waveform. During the time period −1 to +1, the input voltage is a positive going ramp which represents the ordinary deflection of the electron beam. The corresponding output voltage waveform has a parabolic shape. During the time period 1–2, the input voltage waveform is a negative going ramp of much steeper slope; this represents the flyback period of the electron beam. The output voltage during this time is also parabolic in shape. The output voltage in the time period 1–2 is not utilized in dynamic focus systems since a blanking pulse is usually applied to an input electrode of the cathode ray tube during this interval.

In the circuit of FIG. 1, diodes 24 and 18 are forward biased by reason of their connection to negative source 16 via resistors 28 and 30, respectively. Thus diodes 18 and 24 will have a small voltage drop thereacross (e.g., 0.7 v.) which will serve to bias the emitter junctions of transistors 10 and 12 at the point of conduction. Diodes 18 and 24 should have a forward conduction temperature characteristic similar to that of the base-emitter diodes of transistors 10 and 12 in order to provide temperature compensation to the transistors. Diodes sold under the trade name "Stabistor" are adequate for this purpose.

The parabolic output waveform is generated as follows. When the input voltage waveform goes positive, a positive voltage, which is a fraction of the input voltage across the 1 ohm resistor 32 as determined by the ratio of resistors 22 and 26, will appear across resistor 26. This positive voltage will be supplied to the base of transistor 10 and the emitter of transistor 12, turning off transistor 10, and turning on transistor 12. When a negative input voltage is supplied, transistor 12 will be turned off, but this negative voltage will be supplied to the base of transistor 10 via diode 24, which is always forward biased, to turn transistor 10 on.

Since transistors 10 and 12 have a common load resistor 14, the output voltage will appear at a single output terminal and will be proportional to the collector current of whichever transistor is conducting.

The following analysis will demonstrate that the output voltage in the circuit of FIG. 1 is substantially proportional to the square of the input voltage thereto.

It is known[1] that a transistor's collector current, $I_c$, is governed by the following relation:

$$(1)\qquad I_c=-A_nI_e-I_{co}(P_c-1)$$

where $I_e$=emitter current
$A_n$=normal transistor current gain
$I_{co}$=saturation current of collector junction with no emitter current
$P_c=e^{qv'/kt}$ where $q$ is the charge on an electron; $v'$ is collector junction potential; $k$ is Boltzmann's constant; and $t$ is absolute temperature in ° K.

It is also known[1] that a transistor's emitter current, $I_e$, is governed by the following relation:

$$(2)\qquad I_e=I_{eo}(P_e-1)-A_iI_c$$

where $I_{eo}$=saturation current of emitter junction with no collector current,
$P_e=e^{qv./kt}$ where $v.$ is emitter junction potential
$A_i$=inverted transistor current gain (collector functioning as emitter and vice-versa)

Substituting (2) into (1)

$$(3)\qquad I_c=-A_n(I_{eo}(P_e-1)-A_iI_c)-I_{co}(P_c-1)$$

Since the collector junction is reverse biased by a voltage which is relatively large, the $v'$ term in $P_c$ will be negative and large. $P_c$ will therefore be a very small fraction which can be approximated as zero so that $$(4)\qquad I_c=-A_nI_{eo}P_e+A_nI_{eo}+A_nA_iI_c+I_{co}$$

or $$(5)\qquad I_c=\frac{I_{co}+A_nI_{eo}-A_nI_{eo}P_e}{1-A_nA_i}$$

If the emitter junction is forward biased by a voltage V and an input signal voltage $v.$ is applied across said junction, $$(6)\qquad v.=V+v \text{ or } P_e=(e^{qV/kt})(e^{qv/kt})$$

Letting $P_bP_s=(e^{qV/kt})(e^{qv/kt})$ and substituting (6) into (5) and rearranging $$(7)\qquad I_c=\frac{A_n}{1-A_nA_i}(I_{co}/A_n+I_{co}-I_{eo}P_bP_s$$

Since $I_{co}$ and $I_{eo}$ are in microamperes, $I_{eo}P_bP_s$ is much greater than $I_{co}$ and $I_{eo}$; hence $I_{co}$ and $I_{eo}$ can be disregarded; also the multiplier of the parenthetical term will be approximately one for planar transistors, therefore $$(8)\qquad I_c=I_{eo}P_bP_s$$

Since $I_{eo}P_b$ is a constant (K) and since $P_s=e^{qv/kt}$ or $e^{mv}$ where $m=q/kt$.

$$(9)\qquad I_c=Ke^{mv}$$

for one transistor.

[1] Ebers and Moll, "Large-Signal Behavior of Junction Transistors," 42, P.I.R.E., 1761, 4 (1954).

For two transistors having a common collector current and driven in opposite phase, as in FIG. 1, $$(10)\qquad I_c=Ke^{mv}+Ke^{-mv}=2K\frac{(e^{mv}+e^{-mv})}{2}$$

Since $$\cosh x=\frac{e^x+e^{-x}}{2}$$

$$(11)\qquad I_c=2K\cosh mv \text{ or } K'\cosh mv$$

Since $\cosh x=1+x^2/2!+x^4/4!+\ldots$ $$I_c=K'(1+m^2v^2/2+m^4v^4/24+\ldots)$$

Since $mv$ is less than 1, $$(12)\qquad I_c\doteq K'+K'm^2v^2/2=K'+Km^2v^2$$

Since $Km^2$ is a constant ($\underline{K}$)

$$(13)\qquad I_c=K'+\underline{K}v^2$$

This shows that, in the circuit of FIG. 1, the collector current, and hence the output voltage, will be substantially proportional to the square of the input voltage. The additive constant K' in Equation 13 represents a signal level change, which, of course, can be eliminated by capacitive filtering or DC biasing of subsequent circuits.

FIG. 3

Figure 3:
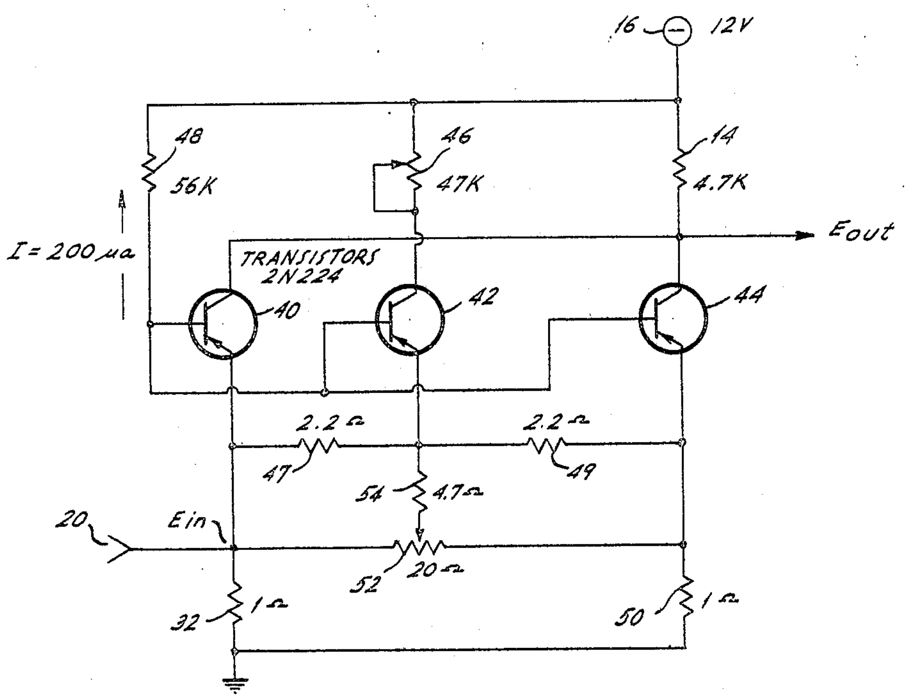
FIGS. 3 and 4 are schematic diagrams of other embodiments of the invention in which the transistors used are biased and coupled to the input signal in a different manner than in the embodiment of FIG. 1.

The embodiment of FIG. 3 operates in the same manner as the embodiment of FIG. 1 except that the two transistors which are used to square the input voltage are driven by the input signal in a different manner than in FIG. 1. Parts in FIG. 3 corresponding to like parts in FIG. 1 have been identified with like reference numerals. The embodiment of FIG. 3 has greater temperature stability, greater gain, and a provision for balancing the manner in which the input signal is applied to the two squaring transistors.

The embodiment of FIG. 3 comprises three transistors 40, 42, and 44. The collectors of transistors 40 and 44 are commonly connected to a negative potential source 16 via resistor 14. The collector of transistor 42 is connected to potential source 16 by way of a variable resistor 46 which is approximately ten times larger than resistor 14. The bases of all three transistors 40, 42, and 44 are commonly connected to source 16 by way of resistor 48 which has a value much larger than that of the base-emitter circuit impedances of transistors 40, 42, and 44. The emitter of transistor 40 is connected to the input terminal 20. A 1 ohm resistor 32, which may be in series with the deflection yoke as discussed above, connects input terminal 20 to ground. The emitter of transistor 42 is connected to the emitter of transistors 40 and 44 by a pair of respective resistors 47 and 49. The emitter of transistor 44 is connected to ground by way of a resistor 50. The end terminals of the resistive element of a potentiometer 52 are connected to the respective emitters of transistors 40 and 44 and the wiper thereof is connected to the emitter of transistor 42 by way of resistor 54.

As in FIG. 1, typical component values or identifications are shown in the drawing. These particular components are desirable but are not critical, except insofar as recited in the appended claims.

In the circuit of FIG. 3 the bases of all three transistors are connected to a substantially constant current source since the value of resistor 48 is many times higher than any impedance associated with any of the base-emitter circuits of transistors 40, 42 and 44. Thus the current through resistor 48 will always remain constant at about 200 $\mu$a. as indicated. It will be appreciated that since a transistor's base current is an inverse function of its collector-emitter voltage, the portion of the 200 $\mu$a. supplied to resistor 48 by each transistor will be an inverse function of the collector-emitter voltage thereof. The transistor with the lowest collector-emitter voltage will supply most of the current to resistor 48.

In FIG. 3, almost all the current supplied to resistor 48 will come from the base of transistor 42 inasmuch as the collector potential of transistor 42 is lower than that of transistors 40 and 44 due to the substantially higher value of resistor 46 as compared with resistor 14. Since its collector resistor has a very high value, transistor 42 will always operate in a "saturated" condition; i.e. the collector current of transistor 42 will not change significantly if the base current thereof changes. Since transistor 42 is always conductive, it serves to supply a fixed forward bias to transistors 40 and 44 via resistors 47 and 49 and the common base connection.

Due to their low base currents, transistors 40 and 44 will be substantially non-conductive at time "0" so that little current will flow through resistor 14. The output potential at the collectors of transistors 40 and 44 will thus be close to the negative potential of source 16 as shown in FIG. 2.

When the potential at input terminal 20 rises in the positive direction, as indicated in FIG. 2 during time interval —"1" to "1," the emitter potential of transistor 40 will rise, thereby lowering the collector-emitter potential of transistor 40, and causing the portion of current supplied to resistor 48 from the base of transistor 40 to rise. Transistor 40, having increased base current, will become increasingly conductive from time "0" to time "1" and supply current through its load resistor 14, thereby raising the potential at the output terminal toward ground. As in the circuit of FIG. 1, the output voltage will represent the square of the input voltage.

When the input signal goes negative, as indicated during time interval "1" to 2," the emitter potential of transistor 40 and 42 will be lowered. The emitter potential of transistor 44 will also be lowered slightly, but not as much as that of transistor 40 or transistor 42. The base current drawn by transistors 40 and 42 will decrease, thereby allowing the base circuit of transistor 44 to supply a greater portion of the current to resistor 48. Conduction of transistor 44 will thus increase and transistor 44 will supply current through resistor 14, causing the collector potential thereof to rise toward ground as indicated during time interval "1" to "2" in FIG. 2.

Any unbalance in the operation of the circuit of FIG. 3, which will be evidenced by asymmetry in the parabolic output waveform, may be corrected by adjusting potentiometer 52, which will effectively vary the ratio of resistors 47 and 49 and hence the portion of signal supplied to the emitters of each of the transistors. An alternative way of balancing the circuit wherein bias potential rather than signal ratio is adjusted will be described in conjunction with the discussion of FIG. 4, infra. The circuit of FIG. 3 will have excellent temperature stability if transistors 40, 42, and 44 are maintained at the same temperature (e.g., through the use of a common mounting member).

FIG. 4

Figure 4:
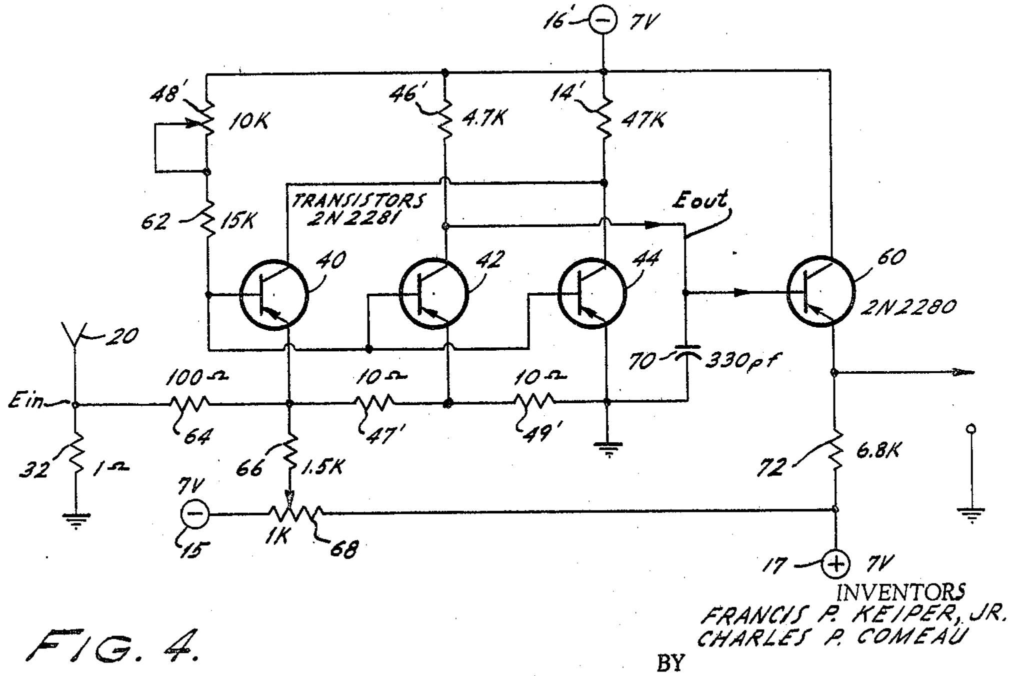

The circuit of FIG. 4 differs from the circuit of FIG. 3 in that the outer two transistors, 40 and 44, which utilize a common collector load resistor, operate in a saturated condition and supply a forward bias to the center transistor. The center transistor is utilized to square both polarities of the input signal. As shown in FIG. 2 the parabolic output voltage waveform in the FIG. 4 circuit is inverted with respect to that of the FIG. 3 circuit.

The circuit of FIG. 4 includes, in addition to transistors 40, 42, and 44 a non-converting buffer stage including transistor 60. The common collector resistor 14' for transistors 40 and 44 is much larger (by about 10 times) than the value of the collector resistor 46' of transistor 42. The bases of transistors 40, 42, and 44 are commonly connected to source 16' via a fixed resistor 62 and a variable resistor 48'. The emitter of transistor 44 is grounded and the emitter of transistor 40 is connected to the input terminal 20 by way of a resistor 64. Input terminal 20 is connected to ground via resistor 32. The emitter of transistor 42 is connected to the emitters of transistors 40 and 44 by way of resistors 47' and 49'. The emitter of transistor 40 is variable biased by means of its connection, via resistor 66, to the wiper terminal of a potentiometer 68. Potentiometer 68 includes a resistor whose end terminals are connected to negative and positive sources 15 and 17, respectively. (Source 15 may be the same source as source 16'.) The collector of transistor 42 is connected to ground by a capacitor 70 and to the base of output transistor 60. The collector of transistor 60 is connected to B— source 16' and the emitter thereof is connected to positive source 17 by way of load resistor 72. The output is taken across load resistor 72 and ground.

When no input signal is applied to terminal 20 (time "0"), transistors 40 and 44 will be saturated due to the presence of their large collector resistor 14'. Transistor 42 will be conductive in its linear range, resistor 48' having been adjusted to bias transistor 42 near saturation. All three transistors will accordingly supply base current to resistors 62 and 48'. Accordingly, the collector voltage of transistor 42 will be close to ground.

When the potential at input terminal 20 goes positive as shown during time interval —1–1 in FIG. 2, the emitter potential of transistor 40 will rise and the base current thereof will increase. The base current of transistor 42 will accordingly decrease and the collector voltage thereof will go negative. The collector voltage of transistor 42 will vary as the square of the input voltage in the same manner as transistors 10 and 12 of FIG. 1 and transistors 40 and 44 of FIG. 3.

When the voltage at input terminal 20 goes negative, during time interval "1" to "2," the emitter potentials of transistors 40 and 42 will be lowered, reducing their base currents and allowing transistor 44 to supply more base current to resistors 62 and 48'. Transistor 42, having a decreased base current, will decrease conduction and the collector voltage thereof will again go negative as indicated during interval "1" to "2."

The biasing circuit including potentiometer 68 adjusts the emitter potential of transistor 40 in order to balance the operation f the circuit to provide a symmetrical output waveform. It will be appreciated by those skilled in the art that in lieu of the biasing arrangement shown in FIG. 4 the signal divider biasing arrangement of FIG. 3 alternatively can be used, or that the biasing arrangement of FIG. 4 can be used in the embodiment of FIG. 3.

Capacitor 70, which is in shunt with the collector terminal of transistor 42 and the base input circuit of transistor 60, acts as a filter to remove any high frequency transients which may occur at this point. The buffer amplifier including transistor 60 isolates the collector of transistor 42 from the output terminal, i.e., the emitter of transistor 60.

In any of the embodiments of FIG. 1, 3, and 4, the PNP transistors may be changed to NPN transistors if the polarity of the biasing sources are reversed.

It will be appreciated that the circuit of the invention will square random and aperiodic signals as well as the periodic signal of FIG. 2.

We claim:

1. A voltage squaring circuit, comprising: first and second transistors, the collectors of both being connected to one terminal of a source of bias potential via a common load impedance, means connecting the emitter of said first transistor and base of said second transistor to the other terminal of said source of bias potential, means connecting the base of said first transistor and the emitter of said second transistor to an input terminal, and means for supplying an input signal between said input terminal and said other terminal of said source of bias potential, said input signal having a sawtooth waveform which is balanced with respect to said other terminal of said source of bias potential, whereby a parabolic waveform output signal will appear at the collectors of said transistors.

2. The squaring circuit of claim 1 further including means for forward biasing the emitter junctions of said first and second transistors.

3. The squaring circuit of claim 2 wherein said forward biasing means comprises: (1) a pair of diodes, one connected from the emitter of each transistor to the base of the other transistor, and (2) a pair of impedances, one connected from the base of each transistor to said one terminal of said source of bias potential, said diodes being poled in the direction of easy conduction with respect to said source of said bias potential.

4. A squaring circuit, comprising: first, second, and third transistors, the collectors of said first and third transistors being connected via a common load impedance to one terminal of a source of bias potential, the collector of said second transistor being connected to said one terminal via an impedance whose value is greater than that of said load impedance, the bases of all three of said transistors being connected to a substantially constant current source which is poled to forward bias the emitter diodes of said transistors, resistive means connecting the emitter of each of said first and third transistors to the emitter of said second transistor, means connecting the emitter of said third transistor to the other terminal of said source of bias potential, means connecting the emitter of said first transistor to one terminal of an input signal source, the other terminal of said input signal source being connected to the other terminal of said source of bias potential.

5. The squaring circuit of claim 4 wherein said input signal source is arranged to supply a signal having a sawtooth waveform which is balanced with respect to said other terminal of said source of bias potential, whereby the voltage at the collectors of said first and second transistors will have a parabolic waveshape.

6. The squaring circuit of claim 4 further including balancing means connected to the emitters of all three of said transistors for adjusting the relative magnitude of resistive coupling between the emitters of said first and third transistors with said second transistor.

7. The squaring circuit of claim 4 wherein said constant current source comprises a resistor connecting said one terminal of said bias source to the bases of said three transistors.

8. The squaring circuit of claim 6 wherein said balancing means comprises a resistor having a moveable tap thereon, the ends of said resistor being connected to the emitters of said first and third transistors, respectively, said movable tap being connected to the emitter of said second transistor.

9. A voltage squaring circuit, comprising: first, second, and third transistors, a load impedance connecting the collector of said second transistor to one terminal of a bias source, a second impedance connecting the collectors of said first and third transistors in common to said one terminal of said bias source, said second impedance having a resistance value greater than that of said load impedance, a substantially constant current source connected to the bases of said first, second, and third transistors and poled to forward bias the emitter junctions of said three transistors, means connecting the emitter of said first transistor to one terminal of a signal source, means connecting the other terminal of said signal source and the emitter of said third transistor to the other terminal of said bias source, and resistive means connecting the emitter of said second transistor to the emitters of said first and third transistors.

10. The squaring circuit of claim 9 wherein said constant current source comprises a resistor connecting the bases of said three transistors to said one terminal of said bias source.

11. The squaring circuit of claim 9 wherein the impedance of said second impedance is about ten times the value of said load impedance.

12. The squaring circuit of claim 9 further including means connected to the emitter of said first transistor for adjustably biasing the emitter of said first transistor.

13. The squaring circuit of claim 9 wherein said signal source is arranged to supply an alternating voltage having a sawtooth waveform which is balanced with respect to said other terminal of said bias source, whereby the voltage at the collectors of said second transistor will have a parabolic waveform.

References Cited

UNITED STATES PATENTS

| | | | |
|---|---|---|---|
| 2,441,387 | 5/1948 | Berger et al. | 328—144 |
| 2,679,002 | 5/1954 | White | 328—144 |
| 3,094,632 | 6/1963 | Wartella | 307—216 |
| 3,154,691 | 10/1964 | Fleisher | 307—216 X |
| 3,238,379 | 3/1966 | Clarke | 307—216 |

JOHN S. HEYMAN, Primary Examiner

STANLEY D. MILLER, Assistant Examiner

U.S. Cl. X.R.

235—193.5, 197; 328—144